(12) United States Patent
Ochiai et al.

(10) Patent No.: US 9,120,549 B2
(45) Date of Patent: Sep. 1, 2015

(54) ENGINE, OUTBOARD MOTOR, AND WATERCRAFT

(71) Applicant: Yamaha Hatsudoki Kabushiki Kaisha, Iwata-shi, Shizuoka (JP)

(72) Inventors: Katsumi Ochiai, Shizuoka (JP); Shinichi Hoshiya, Shizuoka (JP); Shinya Maekawa, Shizuoka (JP); Toshio Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/324,342

(22) Filed: Jul. 7, 2014

(65) Prior Publication Data
US 2014/0322997 A1 Oct. 30, 2014

Related U.S. Application Data

(63) Continuation of application No. 13/610,927, filed on Sep. 12, 2012, now Pat. No. 8,801,482.

(30) Foreign Application Priority Data

Nov. 17, 2011 (JP) ................. 2011-251414

(51) Int. Cl.
*B63H 20/24* (2006.01)
*F01N 3/28* (2006.01)
(Continued)

(52) U.S. Cl.
CPC .............. *B63H 20/245* (2013.01); *B63H 20/14* (2013.01); *F01N 3/005* (2013.01); *F01N 3/28* (2013.01);
(Continued)

(58) Field of Classification Search
CPC ........ B63H 20/24; B63H 21/00; B63H 21/32; B63H 21/34; F01N 13/00; F01N 13/08; F01N 13/004; F01N 3/28; F01N 13/10

USPC ..................... 440/88 R, 89 H, 89 R
See application file for complete search history.

(56) References Cited

U.S. PATENT DOCUMENTS 5,494,467 A * 2/1996 Sohgawa et al. ............. 440/89 R
5,556,311 A * 9/1996 Fujimoto ..................... 440/89 R
(Continued)

FOREIGN PATENT DOCUMENTS

JP 56-99005 U 8/1981
JP 2000-356123 A 12/2000
(Continued)

OTHER PUBLICATIONS

Ochiai et al.; "Engine, Outboard Motor, and Watercraft"; U.S. Appl. No. 13/610,927, filed Sep. 12, 2012.
Official Communication issued in corresponding Japanese Patent Application No. 2011-251414, mailed on Jul. 2, 2015.

*Primary Examiner* — Lars A Olson
(74) *Attorney, Agent, or Firm* — Keating & Bennett, LLP

(57) ABSTRACT

An engine includes a cylinder block including a plurality of cylinders disposed along a V-shaped line, a pair of exhaust manifolds disposed inside the V-shaped line, and an exhaust pipe disposed inside the V-shaped line. Each of the pair of exhaust manifolds includes a first passage that includes a plurality of inflow ports into which exhaust gases from the cylinders flow, a collecting portion at which exhaust gases are collected, and an exhaust port from which exhaust gases are discharged. The exhaust pipe includes a connection passage that includes a pair of intermediate inflow ports that are connected to the exhaust ports, at least one intermediate exhaust port from which exhaust gases are discharged. The connection passage is arranged to connect the pair of intermediate inflow ports and the at least one intermediate exhaust port.

16 Claims, 8 Drawing Sheets

(51) Int. Cl.

| | | |
|---|---|---|
| *F01N 13/08* | (2010.01) | |
| *F01N 13/10* | (2010.01) | |
| *F01N 13/00* | (2010.01) | |
| *F01N 13/12* | (2010.01) | |
| *F01N 13/18* | (2010.01) | |
| *F02F 1/24* | (2006.01) | |
| *F01N 3/00* | (2006.01) | |
| *B63H 20/14* | (2006.01) | |
| *F02B 61/04* | (2006.01) | |
| *F02B 75/22* | (2006.01) | |

(52) U.S. Cl.
CPC .............. *F01N 13/004* (2013.01); *F01N 13/08* (2013.01); *F01N 13/10* (2013.01); *F01N 13/12* (2013.01); *F01N 13/1811* (2013.01); *F02F 1/243* (2013.01); *F02B 61/045* (2013.01); *F02B 75/22* (2013.01); *Y02T 10/20* (2013.01)

(56) References Cited

U.S. PATENT DOCUMENTS

| | | | |
|---|---|---|---|
| 6,302,754 B1 * | 10/2001 | Kashima | 440/88 R |
| 6,662,555 B1 | 12/2003 | Ishii | |
| 8,366,501 B2 * | 2/2013 | Kazuta | 440/89 H |
| 8,668,538 B1 | 3/2014 | Langenfeld et al. | |
| 8,801,482 B2 * | 8/2014 | Ochiai et al. | 440/89 R |
| 8,858,283 B2 * | 10/2014 | Ochiai et al. | 440/89 R |
| 2009/0007550 A1 | 1/2009 | Konakawa et al. | |
| 2010/0240269 A1 | 9/2010 | Ochiai | |
| 2011/0223819 A1 | 9/2011 | Kazuta | |

FOREIGN PATENT DOCUMENTS

| | | |
|---|---|---|
| JP | 2010-242744 A | 10/2010 |
| JP | 2011-190704 A | 9/2011 |

* cited by examiner

ENGINE, OUTBOARD MOTOR, AND WATERCRAFT

BACKGROUND OF THE INVENTION

1. Field of the Invention

The present invention relates to an engine, an outboard motor provided with the engine, and a watercraft provided with the outboard motor.

2. Description of the Related Art

U.S. Pat. No. 6,302,754 B1 (hereinafter, referred to as U.S. Pat. No. 6,302,754 B1) and United States Patent Application Publication No. 2004/0203299 A1 (hereinafter, referred to as US 2004/0203299 A1) each disclose an outboard motor provided with a V-type engine that discharges exhaust gases inside a V bank. A pair of exhaust manifolds are disposed inside the V bank. Exhaust gases discharged from the pair of exhaust manifolds join together at a cylinder block, and then are guided to an exhaust guide that supports the engine.

United States Patent Application Publication No. 2009/0094965 A1 (hereinafter, referred to as US 2009/0094965 A1) discloses an outboard motor provided with a straight-type engine in which a catalyst is mounted. An exhaust manifold is arranged by a side portion of a cylinder block. The catalyst is contained in a side-surface member disposed beside the cylinder block.

SUMMARY OF THE INVENTION

The inventor of preferred embodiments of the present invention described and claimed in the present application conducted an extensive study and research regarding an engine, such as the one described above, and in doing so, discovered and first recognized new unique challenges and previously unrecognized possibilities for improvements as described in greater detail below.

As disclosed in US 2009/0094965 A1, a catalyst is mounted in an engine for use in an outboard motor. However, in the engines disclosed in U.S. Pat. No. 6,302,754 B1 and US 2004/0203299 A1, exhaust gases discharged from two banks are guided to the cylinder block by the mutually different exhaust manifolds. Therefore, when catalysts are mounted in these engines, two catalysts are required to be disposed in the pair of exhaust manifolds, respectively. Additionally, there is a need to provide two sets of devices, such as exhaust concentration sensors, relative to the catalyst. Therefore, the number of components of the engine is greatly increased.

In order to overcome the previously unrecognized and unsolved challenges described above, one preferred embodiment of the present invention provides an engine that includes a cylinder block including a plurality of cylinders disposed along a V-shaped line, a pair of exhaust manifolds disposed inside the V-shaped line, and an exhaust pipe disposed inside the V-shaped line. Each exhaust manifold includes a first passage including a plurality of first inflow ports into which exhaust gases from the cylinders flow, a first collecting portion at which exhaust gases that have flowed into the first inflow ports are collected, and a first exhaust port from which exhaust gases collected by the first collecting portion are discharged. The exhaust pipe includes a connection passage including a pair of intermediate inflow ports that are connected to the first exhaust ports of the pair of exhaust manifolds, respectively, and into which exhaust gases from the first exhaust port flow, and at least one intermediate exhaust port from which exhaust gases that have flowed into the pair of intermediate inflow ports are discharged. The connection portion is arranged to connect the pair of intermediate inflow ports and the at least one intermediate exhaust port.

According to this arrangement, the exhaust manifold and the exhaust pipe, both of which guide exhaust gases, are disposed inside the V-shaped line. In other words, the engine is a V-type engine including an in-bank exhaust system. Exhaust gases that have flowed into a pair of exhaust manifolds are discharged from a plurality of cylinders into a shared exhaust pipe.

In more detail, a first passage that guides exhaust gases is provided in each exhaust manifold, and a connection passage connected to each first passage is provided in the exhaust pipe. A catalyst can be disposed in the connection passage. Exhaust gases from the cylinders flow from a plurality of first inflow ports of the first passage into the first passage, and are collected by a first collecting portion of the first passage. Thereafter, exhaust gases collected by the first collecting portion are discharged from a first exhaust port of the first passage into the connection passage. In other words, exhaust gases discharged from one of the exhaust manifolds flow into the connection passage from one of the intermediate inflow ports, whereas exhaust gases discharged from the other exhaust manifold flow into the connection passage from the other intermediate inflow port. Consequently, exhaust gases discharged from the pair of exhaust manifolds flow into the shared exhaust pipe.

In a preferred embodiment of the present invention, the connection passage further includes a catalyst housing portion disposed between the pair of intermediate inflow ports and the at least one intermediate exhaust port, an upstream portion through which the pair of intermediate inflow ports and the catalyst housing portion are connected, and a downstream portion through which the catalyst housing portion and the at least one intermediate exhaust port are connected. A catalyst can be disposed in the catalyst housing. According to this arrangement, exhaust gases that have flowed into the exhaust pipe are guided to the catalyst housing portion by the upstream portion of the connection passage, and then are purified by the catalyst disposed in the catalyst housing portion. Thereafter, the purified exhaust gases are guided to the intermediate exhaust port of the connection passage by the downstream portion of the connection passage, and then are discharged from the intermediate exhaust port. Exhaust gases discharged from each exhaust manifold flow into the shared exhaust pipe in this manner, and therefore exhaust gases discharged from each exhaust manifold can be purified by the shared catalyst. Therefore, there is no need to provide two catalysts corresponding to two banks, respectively. Additionally, there is no need to provide two sets of devices, such as exhaust concentration sensors, relative to the catalyst. Therefore, an increase in the number of components can be prevented.

The upstream portion may include a pair of upstream branch portions connected to the pair of intermediate inflow ports, respectively. In this case, the pair of upstream branch portions may join together upstream of the catalyst housing portion, and may be connected to the catalyst housing portion.

The upstream portion may include a pair of upstream branch portions independent of each other. In this case, one of the pair of intermediate inflow ports may be connected to the catalyst housing portion through one of the pair of upstream branch portions, whereas the other intermediate inflow port may be connected to the catalyst housing portion through the other upstream branch portion.

If the upstream portion includes a pair of upstream branch portions independent of each other, the at least one intermediate exhaust port may include a pair of intermediate exhaust ports from which exhaust gases that have flowed into the pair of intermediate inflow ports are discharged. In this case, the downstream portion may include a pair of downstream branch portions independent of each other. One of the pair of intermediate exhaust ports may be connected to the catalyst housing portion through one of the pair of downstream branch portions, whereas the other intermediate exhaust port may be connected to the catalyst housing portion through the other downstream branch portion.

The exhaust pipe may include a fixing portion that is fixed to the exhaust manifold and that includes either one of the intermediate inflow port and the intermediate exhaust port, and a floating portion that is movably connected to the exhaust manifold and that includes either one of the intermediate inflow port and the intermediate exhaust port. In this case, the fixing portion may be fixed only to one of the pair of exhaust manifolds, whereas the floating portion may be connected only to the other exhaust manifold. Preferably, the floating portion is arranged so as to be movable with respect to the exhaust manifold in a state in which a space between the floating portion and the exhaust manifold is sealed. In other words, the engine preferably includes a sealing member (e.g., an O ring) by which a space between the floating portion and the exhaust manifold is sealed.

According to this arrangement, a plurality of attachment portions that are attached to the pair of exhaust manifolds are disposed in the exhaust pipe. The attachment portions include the fixing portion fixed to the exhaust manifold and the floating portion movably connected to the exhaust manifold. Therefore, the exhaust pipe is not fixed to the exhaust manifold at all locations but is instead partially fixed so as to be movable. Additionally, either one of the intermediate inflow port and the intermediate exhaust port is provided in the fixing portion and in the floating portion, and therefore exhaust gases pass through the fixing portion and the floating portion.

The connection passage in the exhaust pipe includes the pair of intermediate inflow ports and at least one intermediate exhaust port. Therefore, the exhaust pipe is attached to the pair of exhaust manifolds at at least three locations. Each component of the engine including the exhaust pipe and the exhaust manifold has a dimensional tolerance. Therefore, the positional relationship between a plurality of mounting positions at which the exhaust pipe is attached differs from engine to engine. Therefore, if the exhaust pipe is fixed to the pair of exhaust manifolds at all locations, there may be a concern that a gap resulting from a size variation will be created between the exhaust pipe and the exhaust manifold, and exhaust gases will leak. Therefore, such a size variation can be absorbed by movably connecting a portion (i.e., floating portion) of the exhaust pipe to the exhaust manifold. Therefore, the sealability between the exhaust pipe and the exhaust manifold can be increased.

Each exhaust manifold may further include a second passage including a second inflow port into which exhaust gases flow and a second exhaust port from which exhaust gases that have flowed into the second inflow port are discharged. In this case, the at least one intermediate exhaust port may include a pair of intermediate exhaust ports connected to the second inflow ports of the pair of exhaust manifolds, respectively.

According to this arrangement, the downstream portion of the connection passage allows exhaust gases that have passed through the catalyst housing portion of the connection passage to branch into two exhaust-gas flows, and guides the two exhaust-gas flows to the pair of intermediate exhaust ports of the connection passage. Consequently, exhaust gases are discharged from each intermediate exhaust port. Exhaust gases discharged from one of the intermediate exhaust ports flow into the second passage from the second inflow port provided in one of the exhaust manifolds, whereas exhaust gases discharged from the other intermediate exhaust port flow into the second passage from the second inflow port provided in the other exhaust manifold. Exhaust gases that have flowed into each second passage are discharged from the second exhaust port of the second passage. Therefore, exhaust gases discharged from each exhaust manifold into the exhaust pipe return to the exhaust manifold from the exhaust pipe. The plurality of intermediate exhaust ports are provided in the exhaust pipe in this manner, and therefore the exhaust resistance of the exhaust pipe can be reduced. Therefore, the engine performance can be increased.

The cylinder block may include a third passage connected to the second exhaust port. In other words, a third passage connected to the second passage of the exhaust manifold may be provided in the cylinder block.

The first exhaust port and the second inflow port may be disposed at mutually different heights. In more detail, the first exhaust port may be disposed above the second inflow port, or may be disposed below the second inflow port. In this case, the catalyst may be disposed at a height between the first exhaust port and the second inflow port.

The first exhaust port and the second inflow port may open in the same plane. In other words, a first discharge surface in which the first exhaust port opens and a second inflow surface in which the second inflow port opens may be disposed in the same plane. The first discharge surface may be a plane continuous with the second inflow surface, or may be a plane differing from the second inflow surface. In other words, the first exhaust port and the second inflow port may open in a shared surface, or may open in two mutually different surfaces disposed in the same plane.

According to this arrangement, the first discharge surface and the second inflow surface can be provided in the same process step if the first discharge surface and the second inflow surface are formed by machining (e.g., milling). Therefore, the dimensional accuracy of the first discharge surface and that of the second inflow surface can be increased. The exhaust pipe is attached to the first discharge surface and to the second inflow surface through a sealing member such as a gasket. If the dimensional accuracy of the first discharge surface and that of the second inflow surface is low, there may be a concern that a gap will be created between the exhaust pipe and the exhaust manifold. Therefore, the sealability between the exhaust pipe and the exhaust manifold can be increased by increasing the dimensional accuracy of the first discharge surface and that of the second inflow surface.

The second inflow port and the second exhaust port may open in mutually different planes. In other words, the second inflow surface in which the second inflow port opens and the second discharge surface in which the second exhaust port opens may be disposed in two mutually different planes.

The exhaust manifold may include a drainage channel through which the first passage and the second passage are connected together. The drainage channel may include an upper end portion connected to a lower end portion of the first passage and a lower end portion connected to the second passage below the upper end portion. Preferably, the flow passage area of the drainage channel is smaller than the flow passage area of the connection passage.

The cylinder head of the engine may be integral with the exhaust manifold, or may be a member differing from the exhaust manifold.

Another preferred embodiment of the present invention provides an outboard motor that includes the engine and a power transmission unit that rotates a propeller by transmitting the power of the engine to the propeller. According to this arrangement, the same advantageous effects as above can be fulfilled.

Still another preferred embodiment of the present invention provides a watercraft that includes the outboard motor and a hull to which the outboard motor is attached. According to this arrangement, the same advantageous effects as above can be fulfilled.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A front-rear direction, a right-left direction, and an up-down direction that are hereinafter mentioned are defined with respect to an engine. Hereinafter, a description is given of a case in which the engine is disposed so that a crankshaft axis extends in the up-down direction. However, the engine may be disposed so that the crankshaft axis extends in a horizontal direction, or may be disposed so that the crankshaft axis extends in a direction inclined with respect to the horizontal direction.

First Preferred Embodiment

Figure 1:
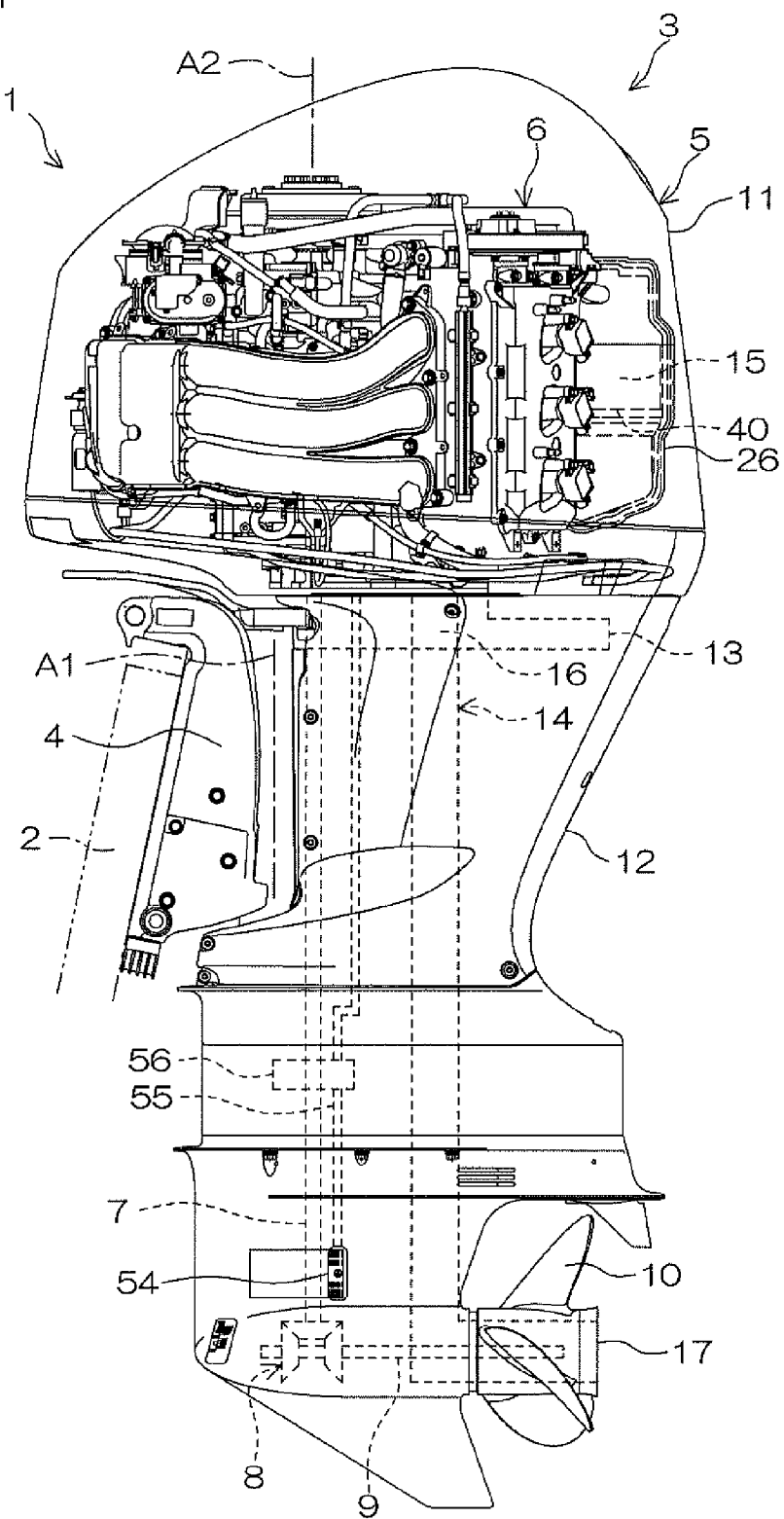
FIG. 1 is a side view showing a general structure of a watercraft according to a first preferred embodiment of the present invention.

FIG. 1 is a side view showing a general structure of a watercraft 1 according to a first preferred embodiment of the present invention. To facilitate understanding, FIG. 1 shows a see-through state in which the inside of an engine cover 11 is seen through.

The watercraft 1 includes a hull 2 and a watercraft propulsion device 3 that propels the hull 2. The watercraft propulsion device 3 includes a bracket 4 that is attachable to the rear (stern) of the hull 2 and an outboard motor 5 rotatably connected to the bracket 4 around a steering shaft axis A1 that extends in the up-down direction.

The outboard motor 5 includes an engine 6, a drive shaft 7, a gear mechanism 8, and a propeller shaft 9. The outboard motor 5 additionally includes an engine cover 11 that contains the engine 6 and a casing 12 disposed below the engine cover 11. The drive shaft 7 extends in the up-down direction in the casing 12. The upper end of the drive shaft 7 is connected to the engine 6 (more specifically, a crankshaft 22 of FIG. 2), whereas the lower end of the drive shaft 7 is connected to the front end of the propeller shaft 9 through the gear mechanism 8. The propeller shaft 9 extends in the front-rear direction in the casing 12. The rear end of the propeller shaft 9 protrudes rearwardly from the casing 12. A propeller 10 is connected to the rear end of the propeller shaft 9. The rotation of the engine 6 is transmitted to the propeller 10 by the drive shaft 7, by the gear mechanism 8, and by the propeller shaft 9. As a result, the propeller 10 rotates together with the propeller shaft 9, and a thrust force that propels the watercraft 1 is generated. The drive shaft 7, the gear mechanism 8, and the propeller shaft 9 define a power transmission unit that transmits the power of the engine 6 to the propeller 10.

The outboard motor 5 additionally includes an exhaust guide 13 that supports the engine 6. The exhaust guide 13 is disposed below the engine 6 in the outboard motor 5. The engine 6 is mounted on the exhaust guide 13. The engine 6 is an internal combustion engine. The exhaust guide 13 supports the engine 6, and guides exhaust gases generated by the engine 6 downwardly. In other words, the outboard motor 5 includes a main exhaust passage 14 through which exhaust gases generated by the engine 6 are guided to the propeller 10. The main exhaust passage 14 includes an engine exhaust passage 15 in the engine 6 and a guide exhaust passage 16 in the exhaust guide. The main exhaust passage 14 is connected to an exhaust outlet 17 that opens at the rear end of a boss portion of the propeller 10. Exhaust gases generated by the engine 6 are discharged into the main exhaust passage 14. When exhaust pressure rises in the main exhaust passage 14, the exhaust gases in the main exhaust passage 14 are discharged from the exhaust outlet 17 into the water.

Figure 2:
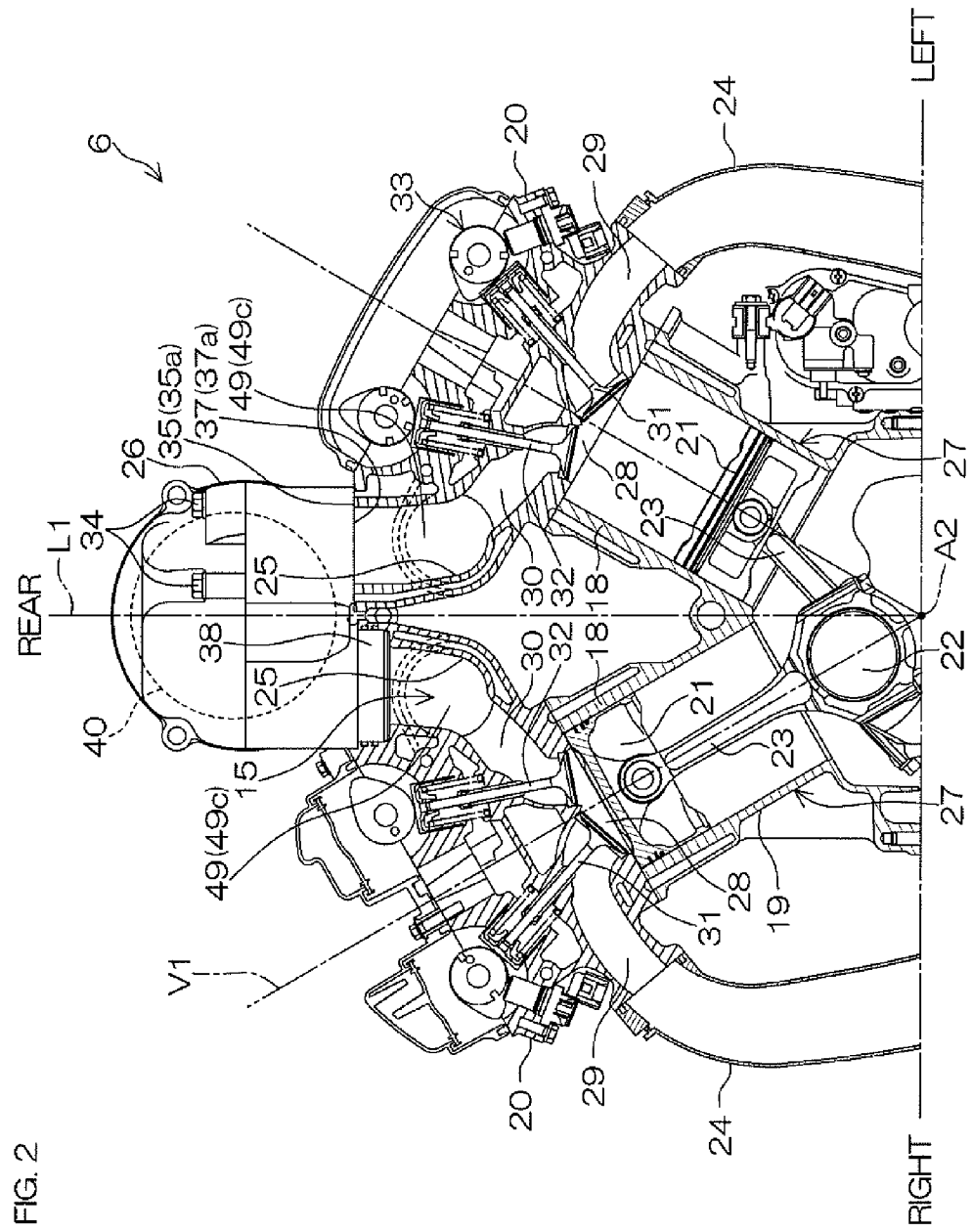
FIG. 2 is a sectional view of an engine perpendicular to a crankshaft axis.

FIG. 2 is a sectional view of the engine 6 perpendicular to a crankshaft axis A2. FIG. 2 shows a cross section having a right-hand side and a left-hand side, which preferably differ in height from each other, with respect to a bisector L1 that bisects a V-shaped line V1 spreading from the crankshaft axis A2 rearwardly (i.e., in an upward direction of the sheet).

The engine 6 preferably is, for example, a V-type six-cylinder four-stroke engine. The engine 6 includes a V-shaped cylinder block 19 including a plurality of cylinders 18 and a pair of cylinder heads 20 attached to the cylinder block 19. The engine 6 additionally includes a plurality of pistons 21 disposed in the cylinders 18, respectively, the crankshaft 22 rotatable around the crankshaft axis A2 that extends in the up-down direction, and a plurality of connecting rods 23 that connect the pistons 21 and the crankshaft 22 together. The engine 6 additionally includes a pair of intake manifolds 24 that guide air to the cylinder head 20, a pair of exhaust manifolds 25 that guide exhaust gases discharged from the cylinder head 20, and an exhaust pipe 26 that guides exhaust gases discharged from the pair of exhaust manifolds 25.

The cylinder block 19 defines two banks 27 arranged like the capital letter V when viewed in a plan view. The two banks 27 extend along the V-shaped line V1. The right-hand bank 27 includes a plurality of cylinders 18 arranged in the up-down direction, and the left-hand bank 27 includes a plurality of cylinders 18 arranged in the up-down direction. The cylinders 18 disposed in the right-hand bank 27 extend horizontally along a right-hand straight line of the V-shaped line V1, and the cylinders 18 disposed in the left-hand bank 27 extend horizontally along a left-hand straight line of the V-shaped line V1. The central axis of each cylinder 18 is disposed on the V-shaped line V1.

The pair of cylinder heads 20 are attached to the rear ends of the two banks 27, respectively. The pair of intake manifolds 24 are connected to the pair of cylinder heads 20, respectively, and the pair of exhaust manifolds 25 are connected to the pair of cylinder heads 20, respectively. FIG. 2 shows an example in which the cylinder head 20 and the exhaust manifold 25 are integral with each other. The exhaust manifold 25 and the cylinder head 20 may be a single integral member, or may be two different members. The intake manifold 24 is disposed outside the V-shaped line V1, whereas the exhaust manifold 25 is disposed inside the V-shaped line V1. The exhaust pipe 26 is attached to the pair of exhaust manifolds 25. The exhaust pipe 26 is disposed inside the V-shaped line V1.

Each cylinder head 20 includes a plurality of combustion chambers 28 that correspond to the plurality of cylinders 18, respectively, and an intake port 29 and an exhaust port 30 that are provided for each combustion chamber 28. The engine 6 additionally includes a plurality of intake valves 31 that open and close the intake ports 29, a plurality of exhaust valves 32 that open and close the exhaust ports 30, and a valve mechanism 33 that moves the intake valves 31 and the exhaust valves 32. The intake ports 29 in the right-hand cylinder head 20 are connected to the right-hand intake manifold 24, whereas the intake ports 29 in the left-hand cylinder head 20 are connected to the left-hand intake manifold 24. Likewise, the exhaust ports 30 in the right-hand cylinder head 20 are connected to the right-hand exhaust manifold 25, whereas the exhaust ports 30 in the left-hand cylinder head 20 are connected to the left-hand exhaust manifold 25. The number of the intake ports 29 corresponding to the cylinder 18 shared therebetween may be one, or may be two. The same applies to the exhaust ports 30.

Air is guided to the pair of cylinder heads 20 by the pair of intake manifolds 24, respectively. As a result, the air is supplied to the combustion chambers 28 through the intake manifold 24 and the intake ports 29. Exhaust gases generated in the combustion chambers 28 are guided to the exhaust manifold 25 by the exhaust ports 30. The exhaust ports 30 extend from the combustion chambers 28 to the inside of the V line (i.e., toward the bisector L1). Therefore, the exhaust ports 30 discharge exhaust gases inside the V line. The exhaust gases discharged from the exhaust ports 30 pass through the exhaust manifold 25, and then flow into the exhaust pipe 26. Therefore, the exhaust gases discharged from each cylinder head 20 flow into the exhaust pipe 26 shared therebetween.

Figure 3:
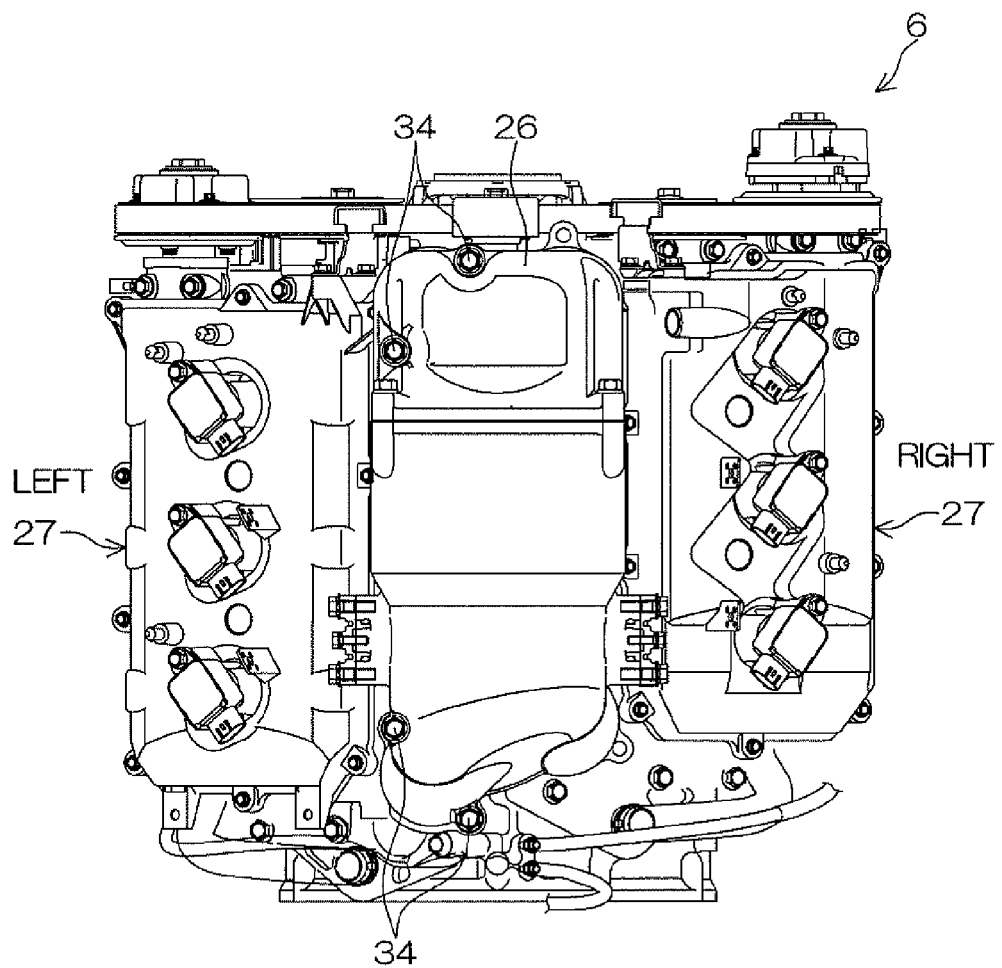
FIG. 3 is a rear view of the engine to which an exhaust pipe has been attached.
Figure 4:
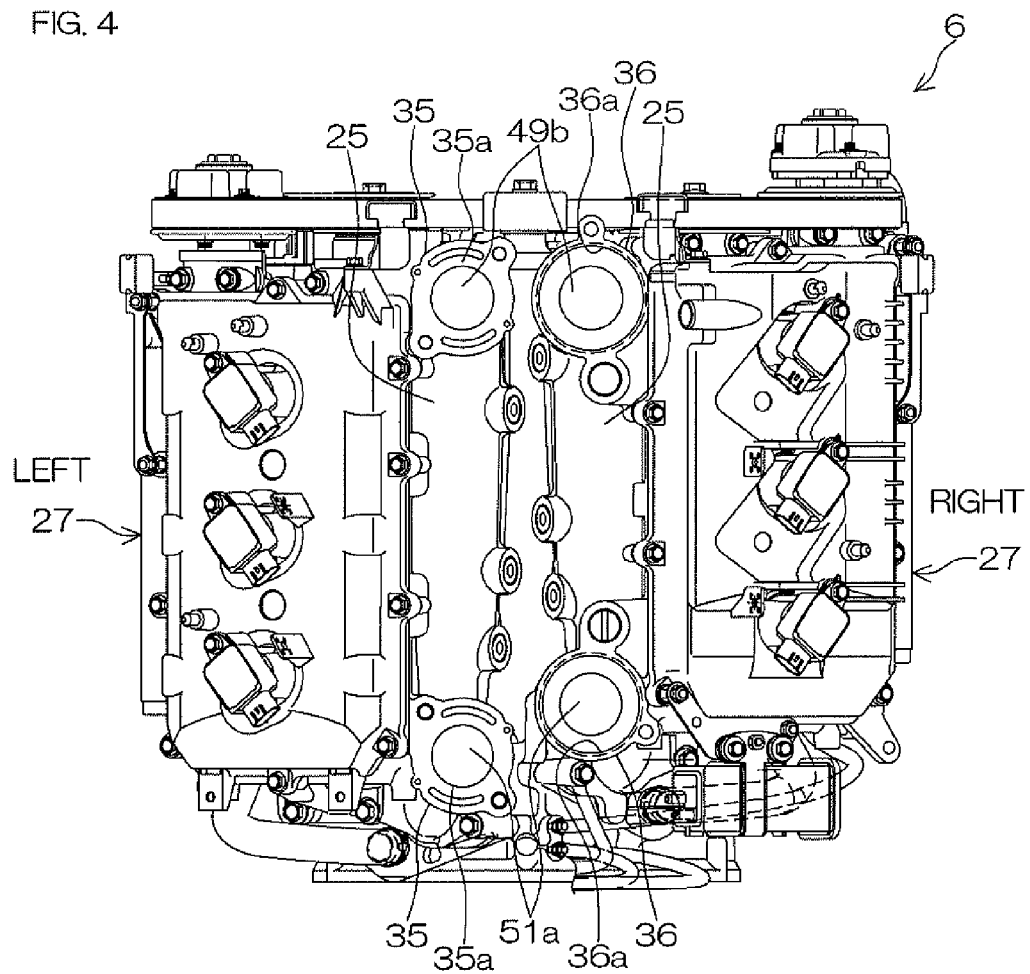
FIG. 4 is a rear view of the engine from which the exhaust pipe has been detached.
Figure 5:
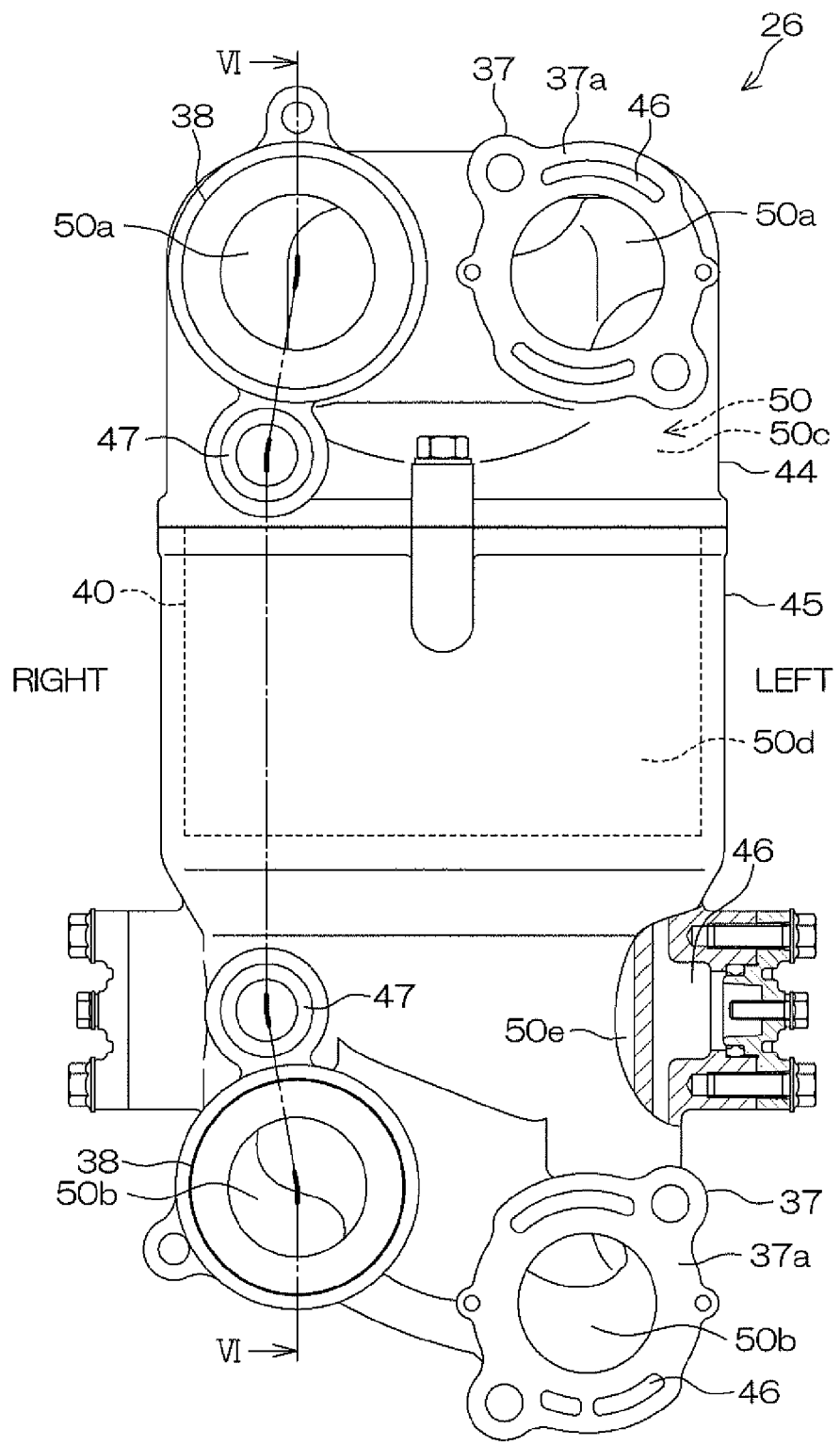
FIG. 5 is a front view of an exhaust pipe according to the first preferred embodiment of the present invention.
Figure 6:
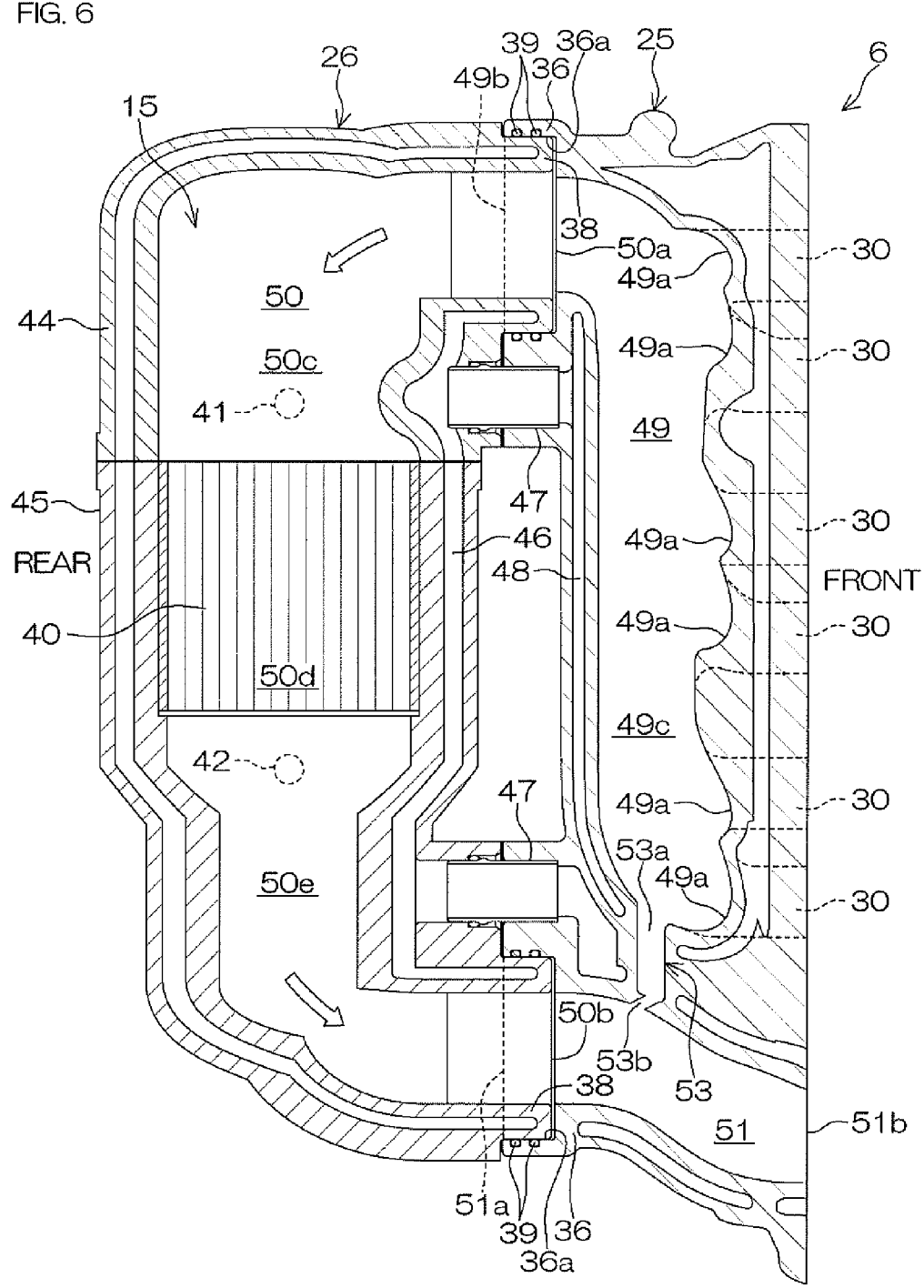
FIG. 6 is a sectional view of an exhaust manifold and the exhaust pipe taken along line VI-VI in FIG. 5.

FIG. 3 is a rear view of the engine 6 to which the exhaust pipe 26 has been attached, and FIG. 4 is a rear view of the engine 6 from which the exhaust pipe 26 has been detached. FIG. 5 is a front view of the exhaust pipe 26, and FIG. 6 is a sectional view of the exhaust manifold 25 and the exhaust pipe 26 taken along line VI-VI in FIG. 5.

As shown in FIG. 3, the exhaust pipe 26 is preferably attached to the pair of exhaust manifolds 25 by a plurality of bolts 34 that are just one non-limiting example of a fastening member. As shown in FIG. 4, the exhaust pipe 26 is detachable from the exhaust manifold 25. The left-hand exhaust manifold 25 includes two fixing portions 35 each of which includes an opening, and the right-hand exhaust manifold 25 includes two supporting portions 36 each of which includes an opening. The two fixing portions 35 are disposed apart from each other in the up-down direction, and the two supporting portions 36 are disposed apart from each other in the up-down direction. The upper fixing portion 35 and the upper supporting portion 36 are disposed substantially at the same height, and the lower fixing portion 35 and the lower supporting portion 36 are disposed substantially at the same height. The opening in each of the upper fixing and supporting portions 35 and 36 is a first exhaust port 49b described below, whereas the opening in each of the lower fixing and supporting portions 35 and 36 is a second inflow port 51a described below.

The exhaust pipe 26 is fixed to the left-hand exhaust manifold 25, and is movably connected to the right-hand exhaust manifold 25. In detail, as shown in FIG. 5, the exhaust pipe 26 includes two fixing portions 37 each of which includes an opening and two insertion portions 38 each of which includes an opening. The two fixing portions 37 are disposed apart from each other in the up-down direction, and the two insertion portions 38 are disposed apart from each other in the up-down direction. The upper fixing portion 37 and the upper insertion portion 38 are disposed substantially at the same height, and the lower fixing portion 37 and the lower insertion portion 38 are disposed substantially at the same height. The opening in each of the upper fixing and insertion portions 37 and 38 is an intermediate inflow port 50a described below, whereas the opening in each of the lower fixing and insertion portions 37 and 38 is an intermediate exhaust port 50b described below.

As shown in FIG. 4, the fixing portion 35 of the exhaust manifold 25 includes a flat attachment surface 35a including an opening. Likewise, as shown in FIG. 5, the fixing portion 37 of the exhaust pipe 26 includes a flat attachment surface 37a including an opening. The two attachment surfaces 35a of the exhaust manifold 25 are preferably disposed in the same plane. Therefore, the two openings (i.e., the first exhaust port 49b and the second inflow port 51a) of the two attachment surfaces 35a open in the same plane. Likewise, the two attachment surfaces 37a of the exhaust pipe 26 are disposed in the same plane, and the two openings (i.e., the intermediate inflow port 50a and the intermediate exhaust port 50b) of the two attachment surfaces 37a open in the same plane. The attachment surface 37a of the exhaust pipe 26 is preferably attached to the attachment surface 35a of the exhaust manifold 25 through a gasket (not shown). The attachment surface 35a and the attachment surface 37a lie on each other so that the openings of the attachment surfaces 35a and 37a face each other. In this state, the fixing portion 35 and the fixing portion 37 are preferably fixed with the bolts 34, for example. The bolts 34 are attached to bolt mounting holes of the fixing portions 35 and 37, respectively.

On the other hand, both the supporting portion 36 and the insertion portion 38 are preferably cylindrical as shown in FIG. 6. The upper insertion portion 38 is inserted in an insertion hole 36a defined by the upper supporting portion 36. Likewise, the lower insertion portion 38 is inserted in an insertion hole 36a defined by the lower supporting portion 36. The insertion portion 38 is supported by the supporting portion 36. A gap between the inner peripheral surface of the supporting portion 36 and the outer peripheral surface of the insertion portion 38 is sealed with a plurality of O-rings 39 disposed between the supporting portion 36 and the insertion portion 38. In a state in which the gap between the supporting portion 36 and the insertion portion 38 is sealed, the insertion portion 38 is movable in a direction along the central axis of the insertion hole 36a with respect to the supporting portion 36. The relative positions of the supporting portion 36 and the insertion portion 38 are changed due to an error in the assembly of the engine 6 or by the thermal expansion of the engine 6. In other words, the supporting portion 36 and the insertion portion 38 define a floating mechanism that absorbs errors in the assembly of the engine 6 or absorbs a displacement of the engine 6.

As shown in FIG. 6, the engine 6 includes a catalyst 40 disposed in the exhaust pipe 26, an upstream sensor 41 and a downstream sensor 42 that are attached to the exhaust pipe 26.

The catalyst 40 is, for example, a three-way catalyst. The catalyst 40 preferably has a honeycomb construction so that exhaust gases can pass therethrough. The upstream sensor 41 is disposed upstream of the catalyst 40 with respect to a direction in which exhaust gases flow, whereas the downstream sensor 42 is disposed downstream of the catalyst 40 with respect thereto. The upstream sensor 41 and the downstream sensor 42 are oxygen concentration sensors made of ceramic (e.g., zirconia), for example. The oxygen concentration sensor is just one non-limiting example of an exhaust concentration sensor that detects the concentration of components contained in exhaust gases. Exhaust gases guided from the exhaust manifold 25 to the exhaust pipe 26 are purified by the catalyst 40. The upstream sensor 41 detects the oxygen concentration of exhaust gases upstream of the catalyst 40, whereas the downstream sensor 42 detects the oxygen concentration of exhaust gases downstream of the catalyst 40. The detection values of the upstream sensor 41 and of the downstream sensor 42 are input to an engine ECU (Electronic Control Unit, not shown) that controls the engine 6. Based on an engine state that includes the oxygen concentration in the exhaust gases, the engine ECU adjusts the amount of fuel injection of a fuel injector or the ignition timing of a spark plug.

As shown in FIG. 6, the exhaust pipe 26 preferably has a cross section shaped like the capital letter C that opens forwardly. The exhaust pipe 26 preferably includes a plurality of pipes (i.e., an upper pipe 44 and a lower pipe 45). Alternatively, the exhaust pipe 26 may consist of a single pipe, for example. The exhaust pipe 26 includes a water jacket 46 through which cooling water flows. The water jacket 46 defines an outer wall of the exhaust pipe 26. The catalyst 40 is disposed inside the water jacket 46. The water jacket 46 is connected to a water jacket 48 disposed in the exhaust manifold 25 through a plurality of cooling water pipes 47 disposed between the two insertion portions 38. The cooling water pipes 47 extend in the front-rear direction. The front ends of the cooling water pipes 47 are inserted in the exhaust manifold 25, whereas the rear ends of the cooling water pipes 47 are inserted in the exhaust pipe 26. Cooling water flows back and forth between the two water jackets (i.e., the water jacket 48 and the water jacket 46) through the cooling water pipes 47.

Figure 7:
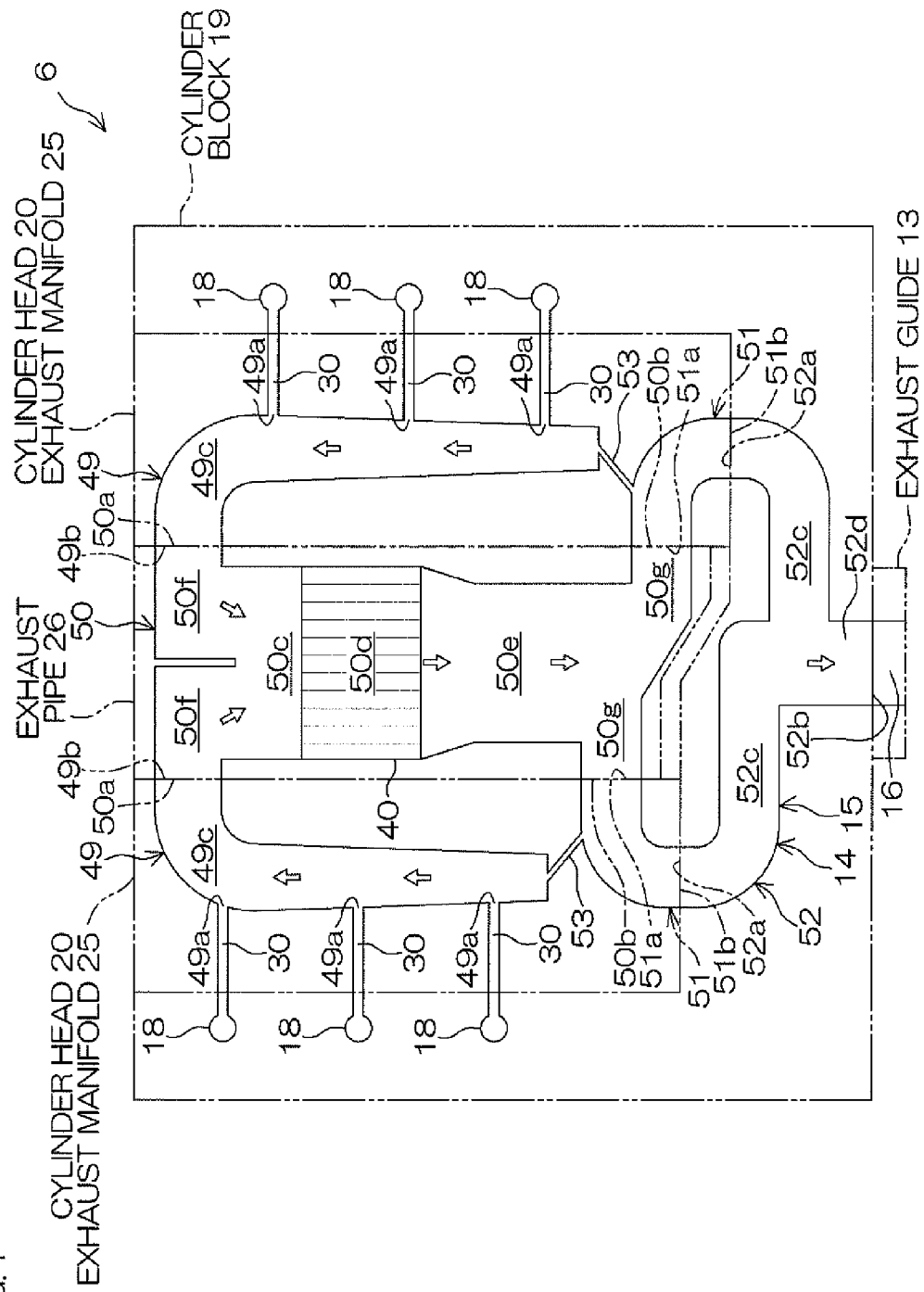
FIG. 7 is a conceptual diagram showing an engine exhaust passage according to the first preferred embodiment of the present invention.

FIG. 7 is a conceptual diagram showing the engine exhaust passage 15. Hereinafter, reference is made to FIG. 6 and FIG. 7.

The exhaust manifold 25, the exhaust pipe 26, and the cylinder block 19 define the engine exhaust passage 15. In detail, as shown in FIG. 7, each exhaust manifold 25 defines a first passage 49 connected to the cylinders 18 through the exhaust ports 30 disposed in the shared cylinder head 20. The exhaust pipe 26 defines a connection passage 50 connected to the pair of first passages 49. Each exhaust manifold 25 further defines a second passage 51 connected to the connection passage 50. The cylinder block 19 defines a third passage 52 connected to the pair of second passages 51. The third passage 52 is connected to the guide exhaust passage 16 disposed in the exhaust guide 13.

As shown in FIG. 6, the first passage 49 includes a plurality of first inflow ports 49a connected to the plurality of exhaust ports 30, respectively, a first collecting portion 49c that collects exhaust gases that have flowed into the first inflow ports 49a, and a first exhaust port 49b through which exhaust gases collected by the first collecting portion 49c are discharged. The first inflow ports 49a are disposed at mutually different heights. The first exhaust port 49b is disposed above the lowest first inflow port 49a. The first collecting portion 49c extends in the up-down direction. The first collecting portion 49c collects exhaust gases that have flowed from each of the first inflow ports 49a, and guides the exhaust gases to the first exhaust port 49b. Exhaust gases that have approached the first exhaust port 49b are discharged rearwardly from the first exhaust port 49b toward the connection passage 50.

As shown in FIG. 6, the connection passage 50 preferably has the shape of the capital letter C that opens forwardly. As shown in FIG. 7, the connection passage 50 includes a pair of intermediate inflow ports 50a connected to the first exhaust ports 49b of the pair of exhaust manifolds 25, respectively, and a pair of intermediate exhaust ports 50b connected to the second inflow ports 51a of the pair of exhaust manifolds 25, respectively. The connection passage 50 additionally includes a catalyst housing portion 50d disposed between the pair of intermediate inflow ports 50a and the pair of intermediate exhaust ports 50b, an upstream portion 50c through which each intermediate inflow port 50a and the catalyst housing portion 50d are connected together, and a downstream portion 50e through which the catalyst housing portion 50d and each intermediate exhaust port 50b are connected together. The upstream portion 50c is disposed above the downstream portion 50e. The catalyst housing portion 50d is disposed at a height between the upstream portion 50c and the downstream portion 50e. The catalyst housing portion 50d is disposed on the route of exhaust gases flowing from the pair of intermediate inflow ports 50a to the pair of intermediate exhaust ports 50b. The catalyst 40 is disposed in the catalyst housing portion 50d.

As shown in FIG. 7, the upstream portion 50c includes a pair of upstream branch portions 50f connected to the catalyst housing portion 50d. The pair of upstream branch portions 50f are connected to the pair of intermediate inflow ports 50a, respectively, and join together upstream of the catalyst housing portion 50d. Therefore, the upstream portion 50c collects exhaust gases that have flowed into the upstream portion 50c from the pair of intermediate inflow ports 50a, and guides the exhaust gases downwardly. Therefore, exhaust gases that have flowed into the upstream portion 50c pass downwardly through the catalyst 40 from above, and are purified thereby. The downstream portion 50e includes a pair of downstream branch portions 50g connected to the catalyst housing portion 50d. The pair of downstream branch portions 50g are connected to the pair of intermediate exhaust ports 50b, respectively, and branch off upstream of the pair of intermediate exhaust ports 50b. Therefore, exhaust gases purified by the catalyst 40 are further guided by the downstream portion 50e downwardly, and are forwardly discharged from the intermediate exhaust ports 50b toward the second passages 51.

As shown in FIG. 6, the second passage 51 includes the second inflow port 51a into which exhaust gases flow and a second exhaust port 51b that discharges exhaust gases that have flowed into the second inflow port 51a. The second passage 51 extends in the front-rear direction. The second passage 51 is disposed below the first passage 49. Therefore, the second inflow port 51a and the second exhaust port 51b are disposed below the first exhaust port 49b. The catalyst 40 is disposed at a height between the first exhaust port 49b and the second inflow port 51a. The first exhaust port 49b and the second inflow port 51a preferably open in the same plane. The second inflow port 51a and the second exhaust port 51b preferably open in mutually different planes. As shown in FIG. 7, the second inflow ports 51a of the pair of second passages 51 are connected to the pair of intermediate exhaust ports 50b, respectively. The second passage 51 guides exhaust gases that have flowed into the second passage 51 forwardly from the second inflow port 51*a*. Thereafter, the exhaust gases are discharged from the second exhaust port 51*b* toward the third passage 52.

As shown in FIG. 7, the third passage 52 includes a pair of third inflow ports 52*a* connected to the pair of second exhaust ports 51*b*, respectively, and a third exhaust port 52*b* connected to the guide exhaust passage 16. The third passage 52 additionally includes a pair of third branch portions 52*c* connected to the pair of third inflow ports 52*a*, respectively, and a third collecting portion 52*d* through which each third branch portion 52*c* and the third exhaust port 52*b* are connected together. Exhaust gases that have flowed into the pair of third branch portions 52*c* from the pair of third inflow ports 52*a* gather at the third collecting portion 52*d*. The third passage 52 guides the exhaust gases downwardly. Thereafter, the exhaust gases are discharged from the third exhaust port 52*b* toward the guide exhaust passage 16.

The first passage 49 upwardly guides exhaust gases that have flowed from the exhaust port 30 as described above. Thereafter, the first passage 49 rearwardly discharges the exhaust gases toward the connection passage 50. As shown in FIG. 6, the connection passage 50 changes the flow direction of exhaust gases from the rearward direction to the downward direction, and then changes the flow direction thereof from the downward direction to the forward direction. Thereafter, the connection passage 50 forwardly discharges the exhaust gases toward the second passage 51. The second passage 51 forwardly guides the exhaust gases toward the third passage 52. Therefore, exhaust gases generated in the combustion chambers 28 pass through the exhaust ports 30, the first passage 49, the connection passage 50, the second passage 51, and the third passage 52 in this order. In this way, exhaust gases are guided from the engine 6 to the exhaust guide 13. Therefore, exhaust gases are purified by the catalyst 40, and then are discharged from the engine 6.

As described above, the first passage 49 and the second passage 51 are connected together by the connection passage 50. Additionally, as shown in FIG. 6, the first passage 49 and the second passage 51 are connected together by a drainage channel 53 provided in the exhaust manifold 25. The drainage channel 53 includes an upper end portion 53*a* connected to a lower end portion of the first passage 49 (i.e., connected to a lower end portion of the first collecting portion 49*c*) and a lower end portion 53*b* that is below the upper end portion 53*a* and that is connected to the second passage 51. The flow passage area of the drainage channel 53 is smaller than the flow passage area of the connection passage 50. In more detail, the maximum flow passage area of the drainage channel 53 is smaller than the minimum flow passage area of the connection passage 50. Therefore, exhaust gases that have been discharged from the exhaust port 30 into the first passage 49 flow into the connection passage 50. Even if exhaust gases flow from the first passage 49 into the drainage channel 53, the amount of flow is very small. Therefore, almost all exhaust gases are purified by the catalyst 40, and then are discharged outwardly from the outboard motor 5.

The engine 6 generates power by burning fuel. Exhaust gases generated as a result of the combustion of fuel, such as gasoline, that contains hydrogen atoms contain water. When the engine 6 rotates at a low speed or when the output of the engine 6 is small, the temperature in the first passage 49 is comparatively low. Therefore, there is a case in which exhaust gases are cooled, so that water (condensed water) is generated in the first passage 49. When the engine 6 is stopped, the temperature in the first passage 49 becomes even lower. Therefore, there is a case in which, after stopping the engine 6, exhaust gases present in the first passage 49 are brought into contact with the inner wall surface of the first passage 49, and dew drops occur. Water generated in the first passage 49 gathers at the lower end portion of the first passage 49. Therefore, the water generated in the first passage 49 is discharged from the first passage 49 into the drainage channel 53, and is further discharged from the drainage channel 53 into the second passage 51. Therefore, the engine 6 can be prevented from misfiring by the backward flow of the water generated in the first passage 49 toward the combustion chamber 28.

The outboard motor 5 takes outside water (i.e., water outside the outboard motor 5) therein, and supplies the outside water to the water jackets of the engine 6 including the water jackets 46 and 48. In more detail, as shown in FIG. 1, the outboard motor 5 includes a water intake 54 that opens in the outer surface of the outboard motor 5 (i.e., in the outer surface of the casing 12) and a water pump 56 that sends water from the water intake 54 to the water jackets of the engine 6 through a cooling water passage 55. The water pump 56 is connected to the drive shaft 7. The water pump 56 is driven by the engine 6. In other words, the engine 6 rotates, and water outside the outboard motor 5 is sent to the water jackets of the engine 6 by the water pump 56. Therefore, water outside the outboard motor 5 is supplied to the engine 6. Therefore, the engine 6 has a higher cooling capability than an ordinary vehicle engine. In other words, in a circulating type cooling device of a vehicle, there is a case in which cooling water that has become warm is supplied to the engine 6. On the other hand, the temperature of water outside the outboard motor 5, i.e., the water temperature of the sea or of the lake is not influenced by the operational state of the engine 6, and therefore cooling water that has a substantially constant temperature is supplied to the engine 6. Therefore, the engine 6 is stably and reliably cooled. Thus, the engine for use in the outboard motor has a higher cooling capability than an engine for use in a vehicle, and therefore condensed water is easily generated. Therefore, the disposition of the drainage channel 53 makes it possible to reliably prevent the engine 6 from misfiring.

As described above, in the first preferred embodiment, the exhaust manifold 25 and the exhaust pipe 26 define a passage in which the catalyst 40 is disposed. Therefore, the catalyst 40 can be mounted in the conventional engine merely by modifying the exhaust manifold of the conventional engine in which the catalyst 40 has not been mounted. Additionally, exhaust gases discharged from the pair of exhaust manifolds 25 flow into the shared exhaust pipe 26, and are purified by the catalyst 40 disposed in the exhaust pipe 26, and therefore there is no need to provide two catalysts 40 corresponding to the two banks 27, respectively. Therefore, there is no need to provide two sets of devices, such as exhaust concentration sensors, for the catalyst 40. Therefore, an increase in the number of components can be prevented.

Additionally, in the first preferred embodiment, the exhaust pipe 26 is fixed to one of the exhaust manifolds 25, and is movably connected to the other exhaust manifold 25. Each component of the engine 6 including the exhaust pipe 26 and the exhaust manifolds 25 has a dimensional tolerance, and therefore, if the exhaust pipe 26 is fixed to the pair of exhaust manifolds 25 at all locations, there is a concern that a gap resulting from a size variation will be created between the exhaust pipe 26 and the exhaust manifolds 25. Therefore, such a size variation can be absorbed by movably connecting a portion (i.e., the insertion portion 38) of the exhaust pipe 26 to the exhaust manifold 25. As a result, the sealability between the exhaust pipe 26 and the exhaust manifold 25 can be increased. Therefore, exhaust gases can be prevented from leaking from a space between the exhaust pipe 26 and the exhaust manifold 25.

Additionally, in the first preferred embodiment, the two attachment surfaces 35a are disposed on the exhaust manifold 25, and the two attachment surfaces 37a are disposed on the exhaust pipe 26. The attachment surface 37a of the exhaust pipe 26 is attached to the attachment surface 35a of the exhaust manifold 25 through the gasket (not shown). The two attachment surfaces 35a are disposed in the same plane, and the two attachment surfaces 37a are disposed in the same plane. Therefore, the dimensional accuracy of the attachment surfaces 35a and 37a by machining can be increased. Therefore, the sealability between the exhaust pipe 26 and the exhaust manifold 25 can be increased. As a result, exhaust gases can be prevented from leaking from a space between the exhaust pipe 26 and the exhaust manifold 25.

Second Preferred Embodiment

Next, a second preferred embodiment of the present invention will be described.

A main difference between the second preferred embodiment and the first preferred embodiment is that the exhaust pipe includes two passages independent of each other (i.e., the pair of upstream branch portions) through which the intermediate inflow port and the catalyst housing portion are connected together.

Figure 8:
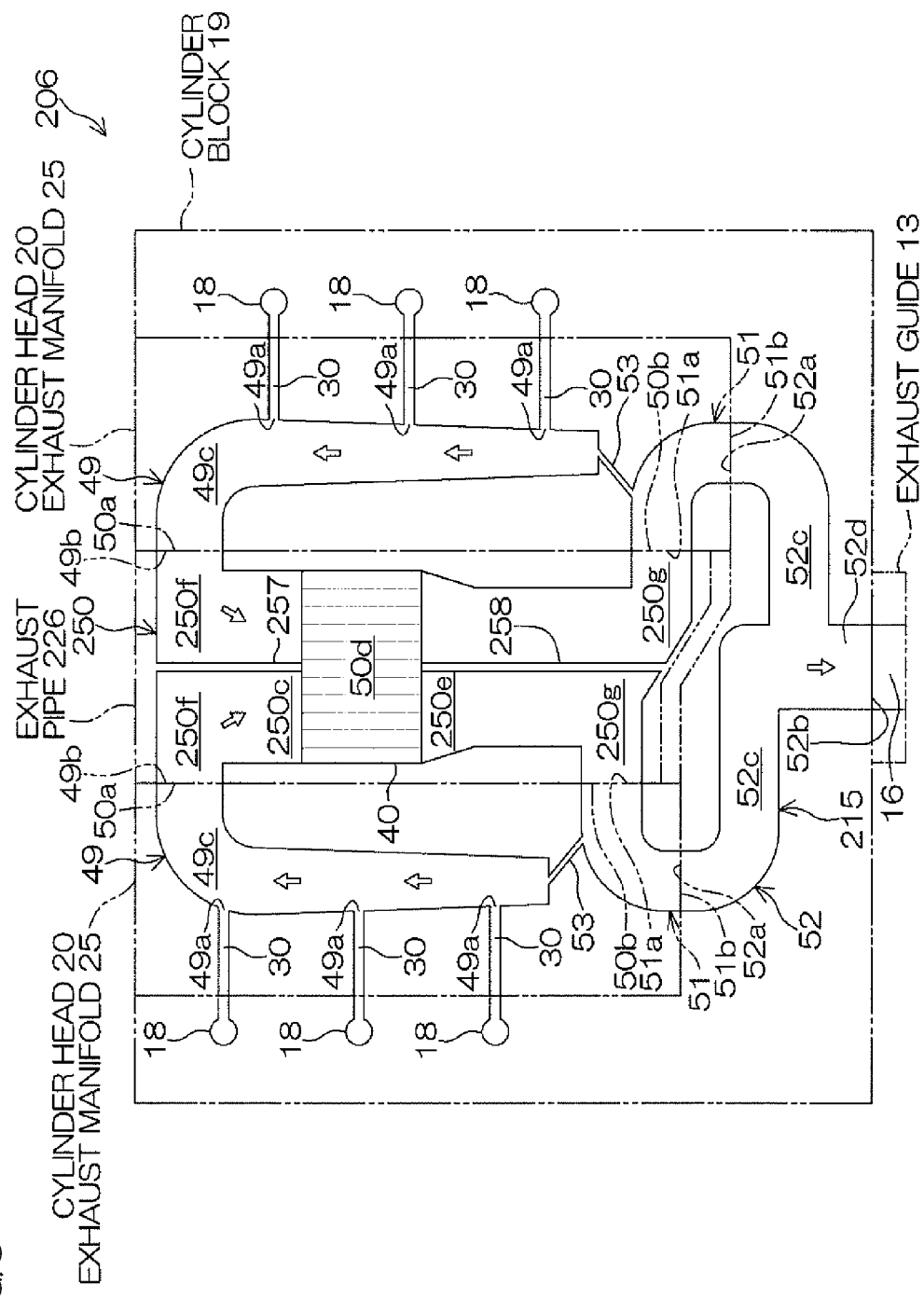
FIG. 8 is a conceptual diagram showing an engine exhaust passage according to a second preferred embodiment of the present invention.

In FIG. 8 mentioned below, the same reference numerals as in FIGS. 1, etc., are given to components corresponding to those illustrated in FIGS. 1 to 7, and a description of the corresponding components is omitted.

FIG. 8 is a conceptual diagram showing an engine exhaust passage 215 according to the second preferred embodiment of the present invention.

The engine 206 according to the second preferred embodiment is preferably arranged in the same manner as the engine 6 according to the first preferred embodiment except for the exhaust pipe. In detail, instead of the exhaust pipe 26 according to the first preferred embodiment, the engine 206 includes an exhaust pipe 226 that guides exhaust gases discharged from the pair of exhaust manifolds 25. The structure of the exhaust pipe 226 is preferably the same as that of the exhaust pipe 26 except for its internal structure. In detail, the exhaust pipe 226 defines a connection passage 250 including an intermediate inflow port 50a, an intermediate exhaust port 50b, an upstream portion 250c, a catalyst housing portion 50d, and a downstream portion 250e. The exhaust pipe 226 includes an upstream partition wall 257 that partitions the upstream portion 250c and a downstream partition wall 258 that partitions the downstream portion 250e in addition to the fixing portion 37 and the insertion portion 38 (see FIG. 5).

The upstream portion 250c includes a pair of upstream branch portions 250f partitioned by the upstream partition wall 257. The pair of upstream branch portions 250f are independent of each other. In other words, the pair of upstream branch portions 250f are partitioned by the upstream partition wall 257 so that exhaust gases cannot flow back and forth between the pair of upstream branch portions 250f. The right-hand intermediate inflow port 50a and the catalyst housing portion 50d are connected together through the right-hand upstream branch portion 250f, whereas the left-hand intermediate inflow port 50a and the catalyst housing portion 50d are connected together through the left-hand upstream branch portion 250f.

The downstream portion 250d includes a pair of downstream branch portions 250g partitioned by the downstream partition wall 258. The pair of downstream branch portions 250g are independent of each other. In other words, the pair of downstream branch portions 250g are partitioned by the downstream partition wall 258 so that exhaust gases cannot flow back and forth between the pair of downstream branch portions 250g. The right-hand intermediate exhaust port 50b and the catalyst housing portion 50d are connected together through the right-hand downstream branch portion 250g, whereas the left-hand intermediate exhaust port 50b and the catalyst housing portion 50d are connected together through the left-hand downstream branch portion 250g.

Exhaust gases that have flowed into the right-hand intermediate inflow port 50a are guided to the catalyst housing portion 50d by the right-hand upstream branch portion 250f. Consequently, exhaust gases flow into the catalyst 40. The catalyst 40 preferably has a honeycomb construction that extends in the axial direction of the catalyst 40. Therefore, exhaust gases that have flowed into the catalyst 40 are guided to the right-hand downstream branch portion 250g. Thereafter, the exhaust gases that have flowed into the downstream branch portion 250g are discharged from the right-hand intermediate exhaust port 50b. Likewise, exhaust gases that have flowed into the left-hand intermediate inflow port 50a flow through the left-hand upstream branch portion 250f, the catalyst housing portion 50d, and the left-hand downstream branch portion 250g in this order, and then are discharged from the left-hand intermediate exhaust port 50b.

Other Preferred Embodiments

Although the first and second preferred embodiments of the present invention have been described as above, the present invention is not limited to the contents of the first and second preferred embodiments, and can be variously modified within the scope of the appended claims.

For example, as described in the first and second preferred embodiments, the second passage provided in the exhaust manifold is preferably connected to the guide exhaust passage through the third passage provided in the cylinder block, for example. However, the second passage may be connected directly to the guide exhaust passage, for example.

Additionally, as described in the first and second preferred embodiments, the drainage channel through which water is discharged from the first passage to the second passage is preferably provided in the engine, for example. However, the drainage channel may not be provided in the engine.

Additionally, as described in the first and second preferred embodiments, the pair of intermediate exhaust ports are preferably provided in the exhaust pipe, and exhaust gases discharged from the pair of exhaust manifolds into the exhaust pipe return to both exhaust manifolds, for example. However, the exhaust manifold and the exhaust pipe may be arranged such that the number of intermediate exhaust ports is one and such that exhaust gases discharged from the pair of exhaust manifolds to the exhaust pipe return only to one of the exhaust manifolds.

A non-limiting example of a correspondence relationship between the components recited in the appended claims and the components mentioned in the above description of preferred embodiments of the present invention is as follows.

V-shaped line: V-shaped line V1
Cylinder: Cylinder 18
Cylinder block: Cylinder block 19
First inflow port: First inflow port 49a
First collecting portion: First collecting portion 49c
First exhaust port: First exhaust port 49b
First passage: First passage 49
Exhaust manifold: Exhaust manifold 25
Intermediate inflow port: Intermediate inflow port 50a
Intermediate exhaust port: Intermediate exhaust port 50b
Catalyst housing portion: Catalyst housing portion 50d
Upstream portion: Upstream portion 50c, 250c
Downstream portion: Downstream portion 50e, 250e
Connection passage: Connection passage 50, 250
Exhaust pipe: Exhaust pipe 26, 226

Catalyst: Catalyst 40
Engine: Engine 6, 206
Upstream branch portion: Upstream branch portion 50*f*, 250*f*
Downstream branch portion: Downstream branch portion 250*g*
Fixing portion: Fixing portion 37
Floating portion: Insertion portion 38
Second inflow port: Second inflow port 51*a*
Second exhaust port: Second exhaust port 51*b*
Second passage: The second passage 51
Third passage: Third passage 52
Drainage channel: Drainage channel 53
Upper end portion of drainage channel: Upper end portion 53*a*
Lower end portion of drainage channel: Lower end portion 53*b*
Cylinder head: Cylinder head 20
Propeller: Propeller 10
Power transmission unit: Drive shaft 7, Gear mechanism 8, Propeller shaft 9
Outboard motor: Outboard motor 5
Hull: Hull 2
Watercraft: Watercraft 1

The present application corresponds to Japanese Patent Application No. 2011-251414 filed in the Japan Patent Office on Nov. 17, 2011, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine comprising:
a cylinder block including a plurality of cylinders disposed along a V-shaped line when viewed in a plan view of the engine;
a pair of cylinder heads attached to the cylinder block;
an exhaust manifold disposed inside the V-shaped line when viewed in the plan view of the engine, the exhaust manifold including a first passage; and
an exhaust pipe disposed inside the V-shaped line when viewed in the plan view of the engine, the exhaust pipe including a connection passage into which exhaust gases from the pair of cylinder heads flow; wherein
the first passage includes:
a plurality of first inflow ports into which exhaust gases from the plurality of cylinders flow;
a first collecting portion at which the exhaust gases that have flowed into the plurality of first inflow ports are collected; and
a first exhaust port from which the exhaust gases collected by the first collecting portion are discharged;
the connection passage includes:
an intermediate inflow port that is connected to the first exhaust port and into which the exhaust gases from the first exhaust port flows; and
an intermediate exhaust port from which the exhaust gases that have flowed into the intermediate inflow port is discharged; and
the connection passage is arranged to connect the intermediate inflow port and the intermediate exhaust port.

2. The engine according to claim 1, wherein the connection passage further includes:
a catalyst housing portion disposed between the intermediate inflow port and the intermediate exhaust port;
an upstream portion through which the intermediate inflow port and the catalyst housing portion are connected; and
a downstream portion through which the catalyst housing portion and the intermediate exhaust port are connected; wherein
the engine further comprises a catalyst disposed in the catalyst housing portion.

3. The engine according to claim 1, further comprising a pair of intake manifolds configured to guide air to the pair of cylinder heads, respectively, and that are connected to the pair of cylinder heads via a plurality of intake ports, respectively, wherein the plurality of intake ports are disposed outside the V-shaped line when viewed in the plan view of the engine.

4. The engine according to claim 1, wherein the exhaust pipe is detachable from the exhaust manifold.

5. The engine according to claim 2, wherein an upstream sensor is disposed upstream of the catalyst with respect to a direction in which exhaust gases flow in the catalyst housing portion.

6. The engine according to claim 5, wherein the upstream sensor is an oxygen sensor.

7. The engine according to claim 2, wherein a downstream sensor is disposed downstream of the catalyst with respect to a direction in which exhaust gases flow in the catalyst housing portion.

8. The engine according to claim 7, wherein the downstream sensor is an oxygen sensor.

9. The engine according to claim 1, wherein the exhaust pipe has a C-shaped cross section.

10. The engine according to claim 1, wherein the exhaust pipe includes a plurality of pipes.

11. The engine according to claim 1, wherein the exhaust pipe includes a water jacket through which cooling water flows.

12. The engine according to claim 11, wherein the water jacket defines an outer wall of the exhaust pipe.

13. The engine according to claim 2, wherein the exhaust pipe includes a water jacket through which cooling water flows, and the catalyst is disposed inside the water jacket.

14. The engine according to claim 11, wherein the water jacket is connected to another water jacket disposed in the exhaust manifold.

15. An outboard motor comprising:
the engine according to claim 1; and
a power transmission unit configured to rotate a propeller by transmitting power of the engine to the propeller.

16. A watercraft comprising:
the outboard motor according to claim 15; and
a hull to which the outboard motor is attached.

* * * * *